US012626601B2

(12) United States Patent
Ishikawa

(10) Patent No.: US 12,626,601 B2
(45) Date of Patent: May 12, 2026

(54) INFORMATION PROVISION SYSTEM AND INFORMATION PROVISION METHOD

(71) Applicant: HONDA MOTOR CO., LTD., Tokyo (JP)

(72) Inventor: Katsumasa Ishikawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 17 days.

(21) Appl. No.: 18/602,090

(22) Filed: Mar. 12, 2024

(65) Prior Publication Data

US 2024/0331549 A1     Oct. 3, 2024

(30) Foreign Application Priority Data

Mar. 29, 2023     (JP) ................................. 2023-054020

(51) Int. Cl.
| | |
|---|---|
| *G08G 5/21* | (2025.01) |
| *G06Q 10/02* | (2012.01) |
| *G06V 20/59* | (2022.01) |
| *G06V 40/18* | (2022.01) |
| *G08G 5/74* | (2025.01) |
| *G10L 15/22* | (2006.01) |

(52) U.S. Cl.
CPC .............. *G08G 5/21* (2025.01); *G06Q 10/02* (2013.01); *G06V 20/59* (2022.01); *G06V 40/18* (2022.01); *G08G 5/74* (2025.01); *G10L 15/22* (2013.01)

(58) Field of Classification Search
CPC .............. G08G 5/21; G08G 5/74; G08G 5/26; G08G 5/23; G08G 5/24; G08G 5/38; G08G 5/50; G06Q 10/02; G06Q 50/40; G06V 20/59; G06V 40/18; G10L 15/22; G10L 15/00; B64D 43/00; G01C 21/3679
See application file for complete search history.

(56) References Cited

U.S. PATENT DOCUMENTS

| | | | | |
|---|---|---|---|---|
| 9,058,742 | B2 * | 6/2015 | Conrardy ................. | G08G 5/52 |
| 11,408,743 | B2 | 8/2022 | Schirano | |
| 2016/0057032 | A1 * | 2/2016 | Tieftrunk ................. | G08G 5/55 |
| | | | | 709/224 |

* cited by examiner

*Primary Examiner* — Bao Long T Nguyen
(74) *Attorney, Agent, or Firm* — Rankin, Hill & Clark LLP

(57) ABSTRACT
An information provision system includes: a predetermined object extraction unit configured to extract a predetermined object present on the ground below a target aircraft based on a flight position of the target aircraft and map information; a predetermined object information acquisition unit configured to access an information database in which information regarding the predetermined object is recorded and to acquire predetermined object information regarding the predetermined object; and a display control unit configured to display an information display screen in which object information regarding the predetermined object is superimposed on scenery below the target aircraft on a display unit viewed by a user who is on the target aircraft.

17 Claims, 4 Drawing Sheets

INFORMATION PROVISION SYSTEM AND INFORMATION PROVISION METHOD

INCORPORATION BY REFERENCE

The present application claims priority under 35 U.S.C. § 119 to Japanese Patent Application No. 2023-054020 filed on Mar. 29, 2023. The content of the application is incorporated herein by reference in its entirety.

BACKGROUND OF THE INVENTION

Field of the Invention

The present invention relates to an information provision system and an information provision method.

Description of the Related Art

Conventionally, a technology of displaying progress of each transportation course and a map indicating a present position on a communication terminal used by a user has been proposed, directed to the user travelling by multimodal transportation, in which transportation by a land route and transportation by an air route are combined (for example, see U.S. Pat. No. 11,408,743 description.)

It is considered that a user who is on an aircraft and travelling on an air route tends to be interested in a viewed object located on the ground since a situation on the ground below the aircraft can be easily viewed. However, in the related art described above, since the situation of the transportation course is displayed, the user himself/herself has to look into information of the viewed object that the user is interested in, and in this case, the aircraft sometimes moves away from the viewed object before the information of the viewed object is obtained. Therefore, it is desirable to promptly provide associated information for a ground object viewed by the user who is on an aircraft and travelling on an air route.

An object of the present invention, which has been made in consideration of such a background, is to provide an information provision system capable of promptly providing associated information for a ground object viewed by a user who is on an aircraft and travelling on an air route, and an information provision method.

SUMMARY OF THE INVENTION

A first aspect for achieving the object described above is an information provision system including: a flight position recognition unit configured to recognize a flight position of a target aircraft; a map information acquisition unit configured to acquire map information including an area below the flight position of the target aircraft; a predetermined object extraction unit configured to extract a predetermined object present on the ground below the target aircraft based on the flight position of the target aircraft and the map information; a predetermined object information acquisition unit configured to access an information database in which information regarding the predetermined object is recorded and to acquire predetermined object information regarding the predetermined object; and a display control unit configured to display an information display screen in which the predetermined object information is superimposed on scenery below the target aircraft on a display unit viewed by a user who is on the target aircraft.

In the information provision system, the display control unit may control a display position of the predetermined object information on the information display screen such that a position of the predetermined object in the scenery below the target aircraft and the display position of the predetermined object information are viewed in an overlapping manner by the user.

In the information provision system, the display control unit may display an air route of the target aircraft and the flight position of the target aircraft on the air route on the information display screen.

In the information provision system, a user action schedule recognition unit configured to access a schedule information database in which schedule information of the user is recorded and to recognize an action schedule associated with travel of the user on the target aircraft may be provided, and the predetermined object extraction unit may extract an object suited to the action schedule of the user as the predetermined object.

In the information provision system, a user preference recognition unit configured to access a user information database in which information regarding a preference of the user is recorded and to recognize the preference of the user may be provided, and the predetermined object extraction unit may extract an object suited to the preference of the user as the predetermined object.

In the information provision system, a speech content recognition unit configured to recognize speech contents of the user may be provided, and the predetermined object extraction unit may extract an object suited to the speech contents of the user as the predetermined object.

In the information provision system, a visual line direction recognition unit configured to recognize a direction of a visual line of the user may be provided, and the predetermined object extraction unit may recognize an object present in a direction in which the visual line of the user is directed as the predetermined object.

In the information provision system, the predetermined object may be a facility that is available for reservation to use, and a facility reservation arrangement unit configured to receive a reservation operation for the facility by the user and to execute processing for arranging a reservation of the facility may be provided.

A second aspect for achieving the object described above is an information provision method executed by a computer, and the method includes: a flight position recognition step of recognizing a flight position of a target aircraft; a map information acquisition step of acquiring map information including an area below the flight position of the target aircraft; a predetermined object extraction step of extracting a predetermined object present on the ground below the target aircraft based on the flight position of the target aircraft and the map information; a predetermined object information acquisition step of accessing an information database in which information regarding the predetermined object is recorded and acquiring predetermined object information regarding the predetermined object; and a display control step of displaying an information display screen in which the predetermined object information is superimposed on scenery below the target aircraft on a display unit viewed by a user who is on the target aircraft.

Advantageous Effects of Invention

According to the information provision system and the information provision method, associated information can be promptly provided for a ground object viewed by a user who is on an aircraft and travelling on an air route.

DETAILED DESCRIPTION OF THE PREFERRED EMBODIMENTS

1. Mode of Information Provision by Information Provision System

Figure 1:
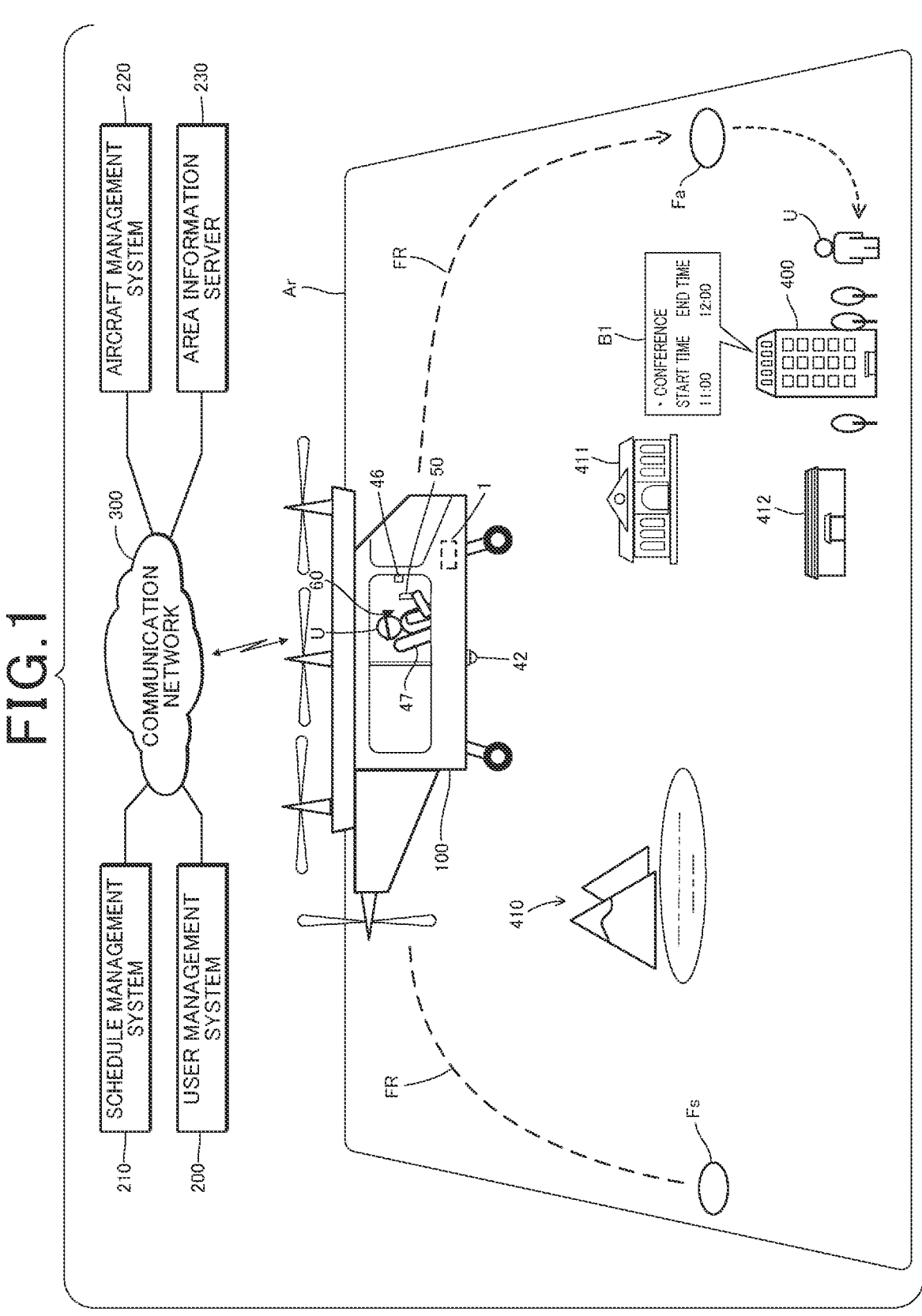
FIG. 1 is an explanatory diagram of a mode of information provision to a user of an aircraft by an information provision system.

With reference to FIG. 1, the mode of the information provision executed by an information provision system 1 of the present embodiment will be explained. The information provision system 1 is loaded in an aircraft 100 (corresponding to a target aircraft of the present disclosure), and provides a user U who is travelling on the aircraft 100 with information regarding a predetermined object present in an area Ar below the aircraft 100.

The aircraft 100 is, for example, an eVTOL (Electric Vertical Take-Off and Landing aircraft). FIG. 1 exemplifies a situation where the user U is onboard the aircraft 100, travels on an air route FR from a port Fs which is a departure spot to a port Fa which is an arrival spot, and participates in a conference held from 11:00 to 12:00 at a conference facility 400 as indicated by a speech balloon B1. Predetermined objects include a sightseeing spot 410 such as a scenic spot, a touring facility 411 such as a museum, and a service providing facility 412 such as a restaurant, etc.

The aircraft 100 includes an outside camera 42 which captures an image of a part below the aircraft 100 and a seat microphone 46 which inputs speech of the user U sitting in a seat 47. The user U wears AR (Augmented Reality) glasses 60 and carries a communication terminal 50. The AR glasses 60 serve as an eyeglass type display device, and have a function of superimposing and displaying digital information on a real world that the user U can see over the glasses. The communication terminal 50 is a smartphone, a portable phone, or a table terminal or the like.

The AR glasses 60 include a gyro sensor that detects a change in the posture of the user U, an infrared camera that detects a direction of the visual line of the user U, a camera that captures an image of the vicinity of the user U, a communication unit and the like. The AR glasses 60 recognize the direction of the visual line of the user U and have a function of displaying information regarding the objects viewed by the user U in the field of view of the AR glasses 60.

The information provision system 1 communicates with the AR glasses 60 and the communication terminal 50 directly or via a communication network 300. Further, the information provision system 1 communicates with a user management system 200, a schedule management system 210, an aircraft management system 220, and an area information server 230 via the communication network 300, and acquires information regarding the user U, objects present in the area Ar below, and the aircraft 100.

Then, the information provision system 1 transmits information (predetermined object information) regarding the predetermined object present in the area Ar below, in which the user U presumably has interest, to the AR glasses 60, and makes the predetermined object information be displayed on the AR glasses 60 (more specifically, a transmission type display unit of the AR glasses 60) so as to be superimposed on the predetermined object in the scenery that the user U is seeing and to be viewed.

Further, when an app (application program) of a flight service is installed in the communication terminal 50 of the user U and the user U is using the app of the flight service, the information provision system 1 transmits data of an information display screen similar to the AR glasses 60 to the communication terminal 50 and makes the similar information display screen be displayed on a display of the communication terminal 50, in response to an operation of the communication terminal 50 by the user U.

In such a manner, in the aircraft 100 during flight, for the AR glasses 60, the information provision system 1 superimposes the predetermined object information regarding the predetermined object present in the area Ar below on actual scenery below that the user U is seeing over the window glass, and displays it. In addition, for the display of the communication terminal 50, the information provision system 1 superimposes the predetermined object information on an image of the scenery below captured by the outside camera 42 and displays it. Thus, the user U who is travelling on the aircraft 100 can be given the predetermined object information regarding the predetermined object present below the aircraft 100 in real time.

2. Configuration of Information Provision System

Figure 2:
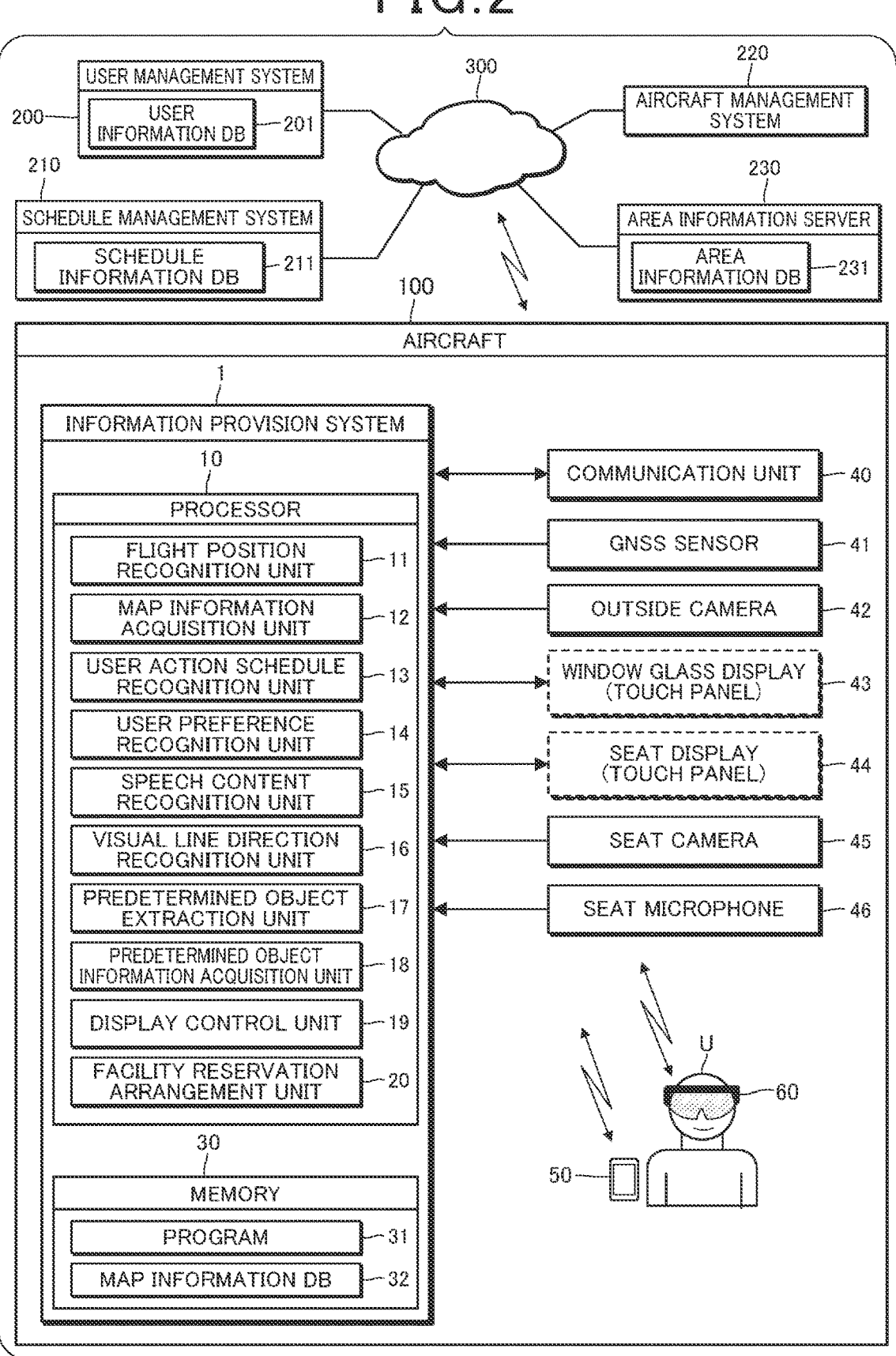
FIG. 2 is a block diagram of the information provision system.

With reference to FIG. 2, the configuration of the information provision system 1 will be explained. The information provision system 1 is connected with the outside camera 42, a window glass display 43, a seat display 44, a seat camera 45, and the seat microphone 46. The window glass display 43, the seat display 44 and the seat camera 45 will be explained in [4. Other embodiments] to be described later.

Further, the information provision system 1 is connected with a communication unit 40 provided in the aircraft 100, and a GNSS (Global Navigation Satellite System) sensor 41 which detects a flight position (present position) of the aircraft 100.

The information provision system 1 communicates with the user management system 200, the schedule management system 210, the aircraft management system 220, and the area information server 230 via the communication network 300 by the communication unit 40. In addition, the information provision system 1 communicates with the AR glasses 60 worn by the user U and the communication terminal 50 used by the user U via the communication network 300 or directly by the communication unit 40.

The user management system 200 includes a user information DB (database) 201 in which profile information of the user U including a preference of the user U is recorded. The profile information of the user U is transmitted from the communication terminal 50 to the user management system 200 in response to an input operation by the user U, by the app (application program) installed in the communication terminal 50. Note that information on the preference of the user U assumed from a category of the app used in the communication terminal 50 by the user U and a category of browsed information or the like may be transmitted from the communication terminal 50 to the user management system 200 and recorded in the profile information of the user U.

The schedule management system 210 includes a schedule information DB 211 in which schedule information of the user U is recorded. The schedule information of the user U is transmitted from the communication terminal 50 to the schedule management system 210 by a schedule app installed in the communication terminal 50. The aircraft management system 220 manages operations of a plurality of aircrafts including the aircraft 100. The area information server 230 includes an area information DB 231 (corresponding to an information database of the present disclosure) in which information regarding objects present in a target area is recorded.

The information provision system 1 is a control unit including a processor 10 and a memory 30 or the like. The memory 30 preserves a program 31 for control of the information provision system 1, and a map information DB (database) 32. Map information recorded in the map information DB 32 includes information regarding objects (such as buildings and natural objects) present in the target area. The processor 10 functions, by reading and executing the program 31, as a flight position recognition unit 11, a map information acquisition unit 12, a user action schedule recognition unit 13, a user preference recognition unit 14, a speech content recognition unit 15, a visual line direction recognition unit 16, a predetermined object extraction unit 17, a predetermined object information acquisition unit 18, a display control unit 19, and a facility reservation arrangement unit 20.

Here, processing executed by the flight position recognition unit 11 corresponds to a flight position recognition step in an information provision method of the present disclosure, and processing executed by the map information acquisition unit 12 corresponds to a map information acquisition step in the information provision method of the present disclosure. Processing executed by the predetermined object extraction unit 17 corresponds to a predetermined object extraction step in the information provision method of the present disclosure, and processing executed by the predetermined object information acquisition unit 18 corresponds to a predetermined object information acquisition step in the information provision method of the present disclosure. Processing executed by the display control unit 19 corresponds to a display control step in the information provision method of the present disclosure.

The flight position recognition unit 11 recognizes the flight position of the aircraft 100 based on a position detection signal outputted from the GNSS sensor 41. The map information acquisition unit 12 acquires the map information including the area Ar below the flight position of the aircraft 100 (see FIG. 1) from the map information DB 32. The user action schedule recognition unit 13 recognizes an action schedule of the user U by accessing the schedule information DB 211 and referring to the schedule information of the user U. In the example of FIG. 1, the user action schedule recognition unit 13 recognizes that the user U is to move from the port Fs to the port Fa on the air route FR and participate in the conference from 11:00 to 12:00 at the conference facility 400.

The user preference recognition unit 14 recognizes the preference of the user U by accessing the user information DB 201 and referring to the profile information of the user U. The speech content recognition unit 15 recognizes speech contents of the user U by analyzing speech voice of the user U inputted to the seat microphone 46. The visual line direction recognition unit 16 recognizes a direction of a visual line of the user U by receiving recognition information of the direction of the visual line of the user U, the information being transmitted from the AR glasses 60. The AR glasses 60 recognize the direction of the visual line of the user U based on a captured image of a built-in infrared camera, and transmit the recognition information of the direction of the visual line of the user U to the information provision system 1.

The predetermined object extraction unit 17 extracts an object satisfying any one of a first extraction condition to a fourth extraction condition below as a predetermined object according to recognition situations of the user action schedule recognition unit 13, the user preference recognition unit 14, the speech content recognition unit 15, and the visual line direction recognition unit 16.

First extraction condition . . . . Objects suited to the action schedule of the user U. In the example of FIG. 1, facilities associated with a subject of the conference that the user U participates (such as a showroom of a vehicle maker and a vehicle museum, when the subject relates to cars), and restaurants or the like near the conference facility 400 since the conference end time is 12:00 are extracted as the predetermined objects satisfying the first extraction condition.

Second extraction condition . . . . Objects suited to the preference of the user U. For example, when the user U is interested in camping, an outdoor shop or the like is extracted as the predetermined object satisfying the second extraction condition.

Third extraction condition . . . . Objects suited to interest matters recognized from the speech contents of the user U. For example, when it is recognized from the speech contents of the user U that the user U is talking with a passenger about what to do in free time after the conference ends, scenic spots or the like near the conference facility 400 are extracted as the predetermined objects satisfying the third extraction condition.

Fourth extraction condition . . . . Objects present in a direction in which the visual line of the user U is directed. For example, when it is recognized that the visual line of the user U is directed to a landmark such as an observatory tower, the landmark is extracted as the predetermined object satisfying the fourth extraction condition.

Figure 3:
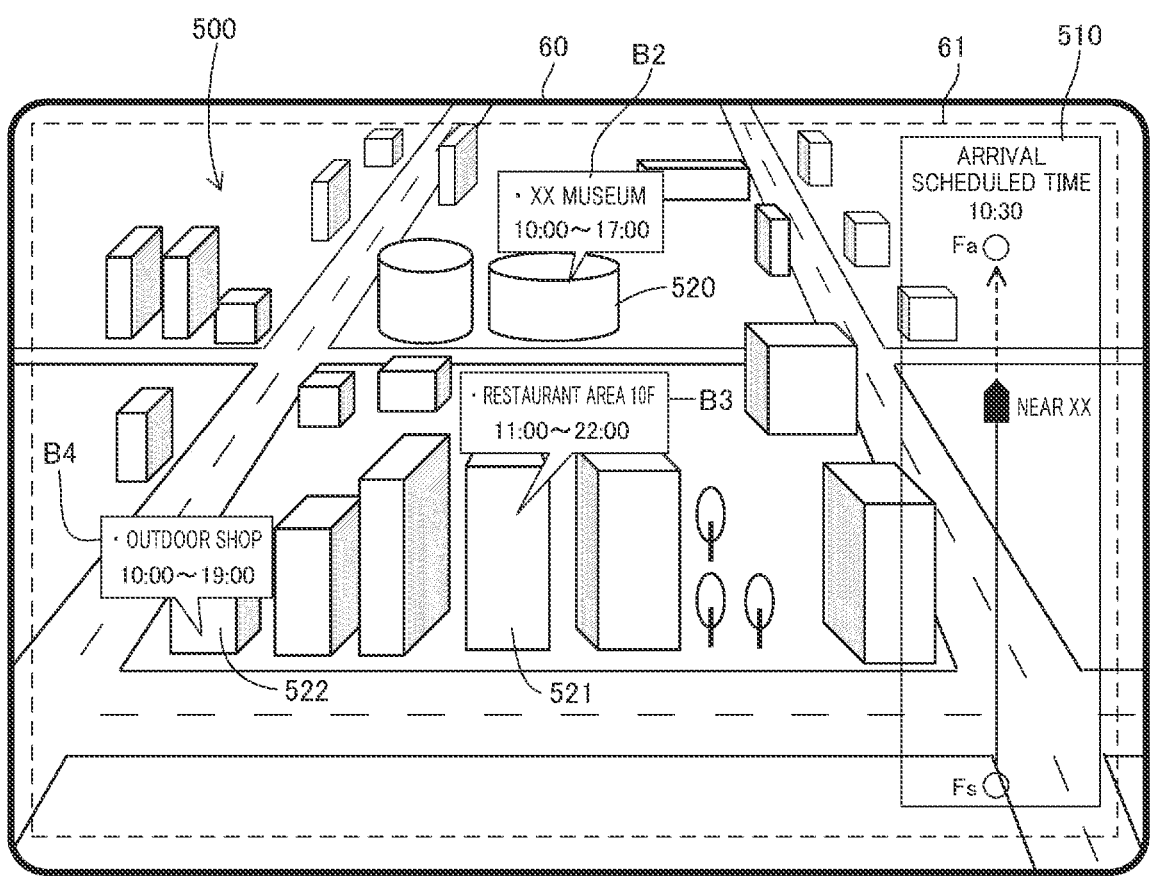
FIG. 3 is an explanatory diagram of an information display screen.

The predetermined object information acquisition unit 18 acquires the predetermined object information regarding the predetermined object extracted by the predetermined object extraction unit 17 by referring to the area information DB 231. The display control unit 19 displays an information display screen 500 to display the information regarding the predetermined object on a transmission type display unit 61 of the AR glasses 60, as illustrated in FIG. 3. On the information display screen 500, a flight route guide 510 indicating the air route (flight route) from the port Fs which is the departure spot of the aircraft 100 to the port Fa which is the arrival spot and the flight position (present position) is displayed.

FIG. 3 exemplifies the case where a museum 520, a high-rise building 521 with a restaurant area, and an outdoor shop 522 are extracted by the predetermined object extraction unit 17. In this case, the display control unit 19 displays a speech balloon B2 indicating information regarding the museum 520 at a position in the direction from the flight position of the aircraft 100 to the museum 520. Similarly, the display control unit 19 displays a speech balloon B3 indicating information regarding the restaurant area of the high-rise building 521 at a position in the direction from the flight position of the aircraft 100 to the high-rise building 521.

Further, the display control unit 19 displays a speech balloon B4 indicating information regarding the outdoor shop 522 at a position in the direction from the flight position of the aircraft 100 to the outdoor shop 522. Thus, the predetermined object information regarding the predetermined objects which presumably the user U looking down from the aircraft 100 views and in which the user U presumably has the interest can be promptly provided in association with the positions of the predetermined objects.

The speech balloons B2 to B4 are displayed as operation buttons virtually disposed on a real space around the user U, and when a gesture of operating the speech balloons B2 to B4 by the user U is recognized by the captured image of the built-in camera and a detection signal of the gyro sensor, the AR glasses 60 transmit operation information to the information provision system 1. The display control unit 19 receives the operation information of the speech balloons B2 to B4 transmitted from the AR glasses 60, and when it is recognized that the user U has operated the speech balloons B2 to B4, displays further detailed information of the predetermined objects.

Further, when the predetermined object is a facility that is available for reservation to use, such as a restaurant and an accommodation facility, the display control unit 19 displays reservation guidance for the facility. The facility reservation arrangement unit 20 arranges the reservation of a target facility by transmitting reservation application information to the target facility in response to the operation of a reservation application for the facility by the user U. The operation of the reservation application for the facility by the user U is performed by operating an operation unit provided near the seat 47 or a virtual operation button or the like displayed on the AR glasses 60 similarly to the speech balloons B2 to B4.

Further, the display control unit 19 displays the information display screen 500 on the display of the communication terminal 50 of the user U. The display control unit 19 superimposes the information display screen 500 on the scenery image of the area Ar below captured by the outside camera 42 and displays it on the communication terminal 50. In this case, while the actual scenery is a background in FIG. 3, the scenery image captured by the outside camera 42 is the background.

In addition, a travelling route and a travelling method (such as travelling by a share vehicle) when the user U moves to the conference facility 400 which is a destination spot after arriving at the port Fa, as illustrated in FIG. 1, may be displayed on the information display screen 500. By the display, the user U can confirm a way to go to the target facility that the user U has gotten interested in when travelling on the air route FR on the aircraft 100 by recognizing a relative position from the conference facility 400 which is the destination spot so that an effect that it becomes easy to have an image of movement such as stopping by the target facility on the way to the conference facility 400 can be achieved. Note that timing of displaying the travelling route and the travelling method may be when the travel on the aircraft 100 is started, when the predetermined object is extracted by the predetermined object extraction unit 17, or when the predetermined object positioned at a location close to the action schedule of the user U enters the field of view of the user U, or the like.

3. Information Provision Processing

According to a flowchart illustrated in FIG. 4, a procedure of the information provision processing executed by the information provision system 1 will be explained. The information provision system 1 repeatedly executes the information provision processing by the flowchart illustrated in FIG. 4, when the aircraft 100 flies and travels on the air route FR (see FIG. 1).

Figure 4:
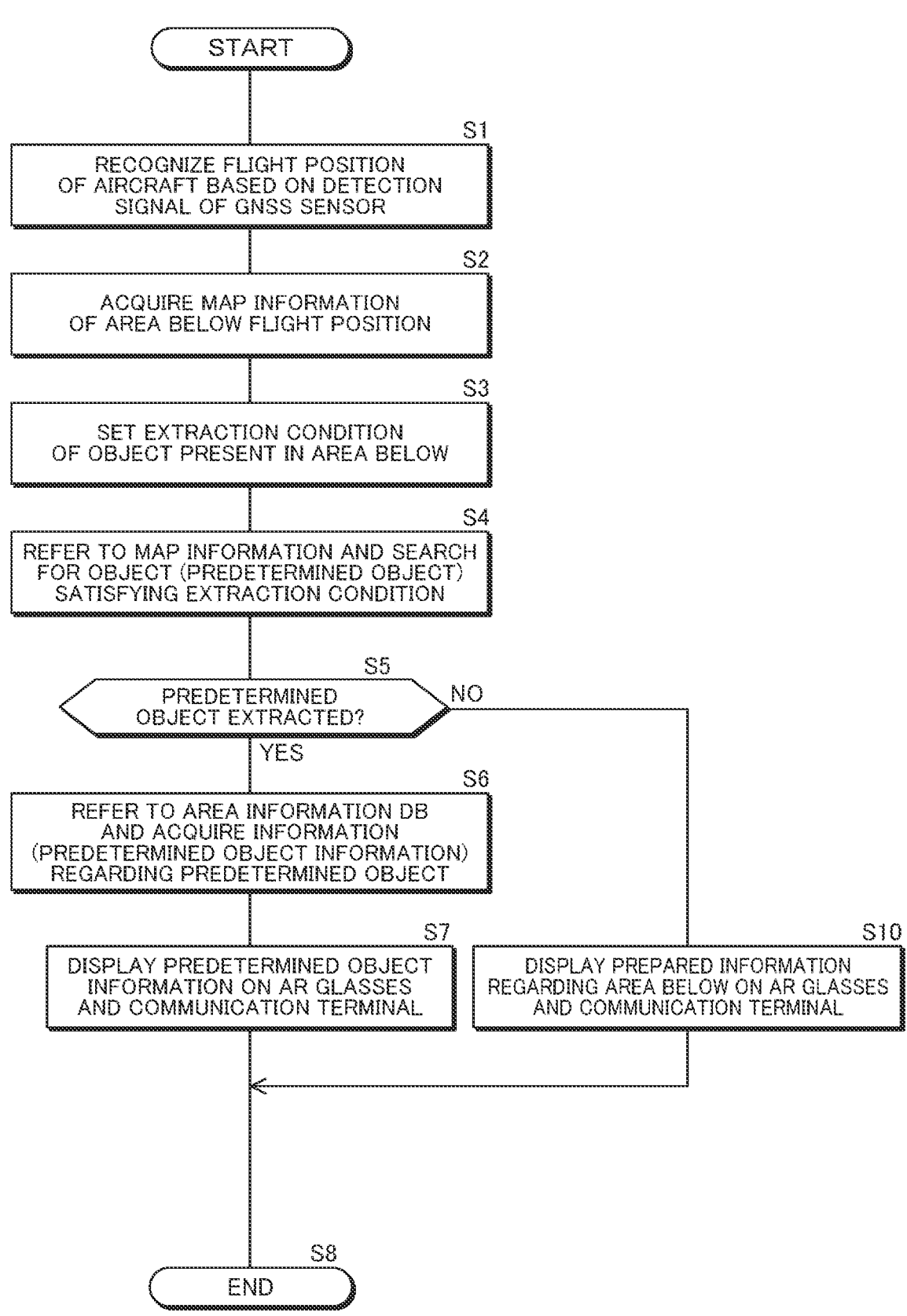
FIG. 4 is a flowchart of information provision processing.

In step S1 in FIG. 4, the flight position recognition unit 11 recognizes the flight position (present position) of the aircraft 100 based on the detection signal of the GNSS sensor 41. In following step S2, the map information acquisition unit 12 refers to the map information DB 32 and acquires the map information of the area Ar below the flight position of the aircraft 100. In next step S3, the predetermined object extraction unit 17 sets the first extraction condition to the fourth extraction condition according to the action schedule of the user U recognized by the user action schedule recognition unit 13, the preference of the user U recognized by the user preference recognition unit 14, the speech contents of the user U recognized by the speech content recognition unit 15, and the direction of the visual line of the user U recognized by the visual line direction recognition unit 16.

In following step S4, the predetermined object extraction unit 17 searches for the object (predetermined object) satisfying any one of the first extraction condition to the fourth extraction condition, based on the map information of the area Ar below. In next step S5, the predetermined object extraction unit 17 advances the processing to step S6 when the predetermined object is extracted, and advances the processing to step S10 when the predetermined object is not extracted.

In step S6, the predetermined object information acquisition unit 18 accesses the area information DB 231 and acquires the information (predetermined object information) regarding the predetermined object. In following step S7, the display control unit 19 superimposes the information display screen 500 to display the predetermined object information on the scenery of the area Ar below and displays it on the AR glasses 60 worn by the user U or the display of the communication terminal 50 used by the user U, as described above with reference to FIG. 3.

In step S10, the display control unit 19 superimposes an information display screen to display prepared information regarding the area Ar below on the scenery of the area Ar below, displays it on the AR glasses 60 worn by the user U or the display of the communication terminal 50 used by the user U, and advances the processing to step S8. In this case, the prepared information regarding the area Ar below is, for example, the information regarding objects in which general passengers of the aircraft 100 presumably tend to have the interest, such as a landmark like an observatory tower which is easy to be viewed from the sky and a popular scenic spot.

Note that, in step S7, the prepared information displayed in step S10 may be displayed together with the predetermined object information. In this case, emphatic display of making luminance of the predetermined object information higher than that of the prepared information or the like may be performed so that the visibility of the predetermined object information becomes higher than that of the prepared information.

4. Other Embodiments

The embodiment described above illustrates the configuration that the information provision system 1 of the present disclosure is provided in the aircraft 100. As another embodiment, the information provision system 1 may be provided in the aircraft management system 220. In this case, flight position information of the aircraft 100 is transmitted from the aircraft 100 to the aircraft management system 220, and the processing of extracting the predetermined object and the processing of acquiring the information regarding the predetermined object are performed in the aircraft management system 220. Then, the data of the information display screen to display the predetermined object information regarding the predetermined object is transmitted from the aircraft management system 220 to the aircraft 100, and is displayed on the window glass display 43 of the aircraft 100, the seat display 44 and the display of the communication terminal 50 of the user U.

Alternatively, the information provision system 1 may be provided in the communication terminal 50 used by the user U. In this case, the flight position information of the aircraft 100 is transmitted from the control unit or the like of the aircraft 100 to the communication terminal 50, and the processing of extracting the predetermined object and the processing of acquiring the information regarding the predetermined object are performed in the communication terminal 50. Then, the data of the information display screen to display the predetermined object information regarding the predetermined object is transmitted from the communication terminal 50 to the control unit or the like of the aircraft 100, is displayed on the window glass display 43 of the aircraft 100 and the seat display 44, and is also displayed on the display of the communication terminal 50.

In the embodiment described above, the information provision system 1 extracts the predetermined object which satisfies any one of the first extraction condition based on a recognition result by the user action schedule recognition unit 13, the second extraction condition based on the recognition result by the user preference recognition unit 14, the third extraction condition based on the recognition result by the speech content recognition unit 15, and the fourth extraction condition based on the recognition result by the visual line direction recognition unit 16. As another embodiment, at least one of the user action schedule recognition unit 13, the user preference recognition unit 14, the speech content recognition unit 15 and the visual line direction recognition unit 16 may be provided, and at least one of the first extraction condition to the fourth extraction condition may be set as an extraction condition of the predetermined object. Alternatively, an extraction condition other than the first extraction condition to the fourth extraction condition may be set.

In the embodiment described above, the AR glasses 60 and the display of the communication terminal 50 used by the user U are presented as display units of the present disclosure to display the information regarding the predetermined object, however, other displays may be used. For example, as illustrated in FIG. 2, the information regarding the predetermined object may be displayed on the window glass display 43 provided on the window glass near the seat 47 of the aircraft 100 and the seat display 44 disposed in front of the seat 47. The window glass display 43 is a transparent display, and FIG. 2 illustrates the example that the window glass display 43 and the seat display 44 are touch panels with a touch sensor arranged on a surface and the seat camera 45 which captures an image of the user U is provided in order to recognize the direction of the visual line of the user U.

The information provision system 1 displays the information (predetermined object information) regarding the predetermined object present in the area Ar below, in which the user U presumably has the interest, so as to be superimposed on the predetermined object in the scenery that the user U is seeing and to be viewed, on the window glass display 43. In addition, the information provision system 1 superimposes the information regarding the predetermined object on an image part of the predetermined object in the image of the scenery of the area Ar below from the sky, the image being captured by the outside camera 42, and displays it on the seat display 44.

Note that FIG. 2 is a schematic diagram in which a functional configuration of the information provision system 1 is divided according to main processing contents and illustrated in order to facilitate understanding of the claimed invention, and the configuration of the information provision system 1 may be configured by other divisions. In addition, the processing of individual components may be executed by one hardware unit or may be executed by a plurality of hardware units. Further, the processing by the individual components illustrated in FIG. 4 may be executed by one program or may be executed by a plurality of programs.

5. Configurations Supported by Embodiments Described Above

The embodiments described above are specific examples of the configurations below.

(Configuration 1) An information provision system including: a flight position recognition unit configured to recognize a flight position of a target aircraft; a map information acquisition unit configured to acquire map information including an area below the flight position of the target aircraft; a predetermined object extraction unit configured to extract a predetermined object present on the ground below the target aircraft based on the flight position of the target aircraft and the map information; a predetermined object information acquisition unit configured to access an information database in which information regarding the predetermined object is recorded and to acquire predetermined object information regarding the predetermined object; and a display control unit configured to display an information display screen in which the predetermined object information is superimposed on scenery below the target aircraft on a display unit viewed by a user who is on the target aircraft.

According to the information provision system of configuration 1, the associated information can be promptly provided for a ground object viewed by a user who is on an aircraft and travelling on an air route.

(Configuration 2) The information provision system according to configuration 1, in which the display control unit controls a display position of the predetermined object information on the information display screen such that a position of the predetermined object in the scenery below the target aircraft and the display position of the predetermined object information are viewed in an overlapping manner by the user.

According to the information provision system of configuration 2, the user viewing the scenery from the sky can be given the predetermined object information in association with the position of the predetermined object.

(Configuration 3) The information provision system according to configuration 1 or configuration 2, in which the display control unit displays an air route of the target aircraft and the flight position of the target aircraft on the air route on the information display screen.

According to the information provision system of configuration 3, the user can be given the predetermined object information in association with a travelling process of the target aircraft.

(Configuration 4) The information provision system according to any one of configuration 1 to configuration 3, including a user action schedule recognition unit configured to access a schedule information database in which schedule information of the user is recorded and to recognize an action schedule associated with travel of the user on the target aircraft, in which the predetermined object extraction unit extracts an object suited to the action schedule of the user as the predetermined object.

According to the information provision system of configuration 4, the user can be given the predetermined object information associated with the predetermined object in which the user is highly interested presumably from the action schedule of the user.

(Configuration 5) The information provision system according to any one of configuration 1 to configuration 4, including a user preference recognition unit configured to access a user information database in which information regarding a preference of the user is recorded and to recognize the preference of the user, in which the predetermined object extraction unit extracts an object suited to the preference of the user as the predetermined object.

According to the information provision system of configuration 5, the user can be given the predetermined object information associated with the predetermined object in which the user is highly interested presumably since the predetermined object is suited to the preference of the user.

(Configuration 6) The information provision system according to any one of configuration 1 to configuration 5, including a speech content recognition unit configured to recognize speech contents of the user, in which the predetermined object extraction unit extracts an object suited to the speech contents of the user as the predetermined object.

According to the information provision system of configuration 6, the user can be given the predetermined object information associated with the predetermined object in which the user has the interest presumably from the speech contents of the user.

(Configuration 7) The information provision system according to any one of configuration 1 to configuration 6, including a visual line direction recognition unit configured to recognize a direction of a visual line of the user, in which the predetermined object extraction unit recognizes an object present in a direction in which the visual line of the user is directed as the predetermined object.

According to the information provision system of configuration 7, the user can be given the predetermined object information regarding the predetermined object at which the user is gazing presumably since the user directs the visual line.

(Configuration 8) The information provision system according to any one of configuration 1 to configuration 7, in which the predetermined object is a facility that is available for reservation to use, the information provision system including a facility reservation arrangement unit configured to receive a reservation operation for the facility by the user and to execute processing for arranging a reservation of the facility.

According to the information provision system of configuration 8, the user can be supported with an easy reservation for the facility that the user has gotten interested in when looking at the predetermined object information.

(Configuration 9) An information provision method executed by a computer, the method including: a flight position recognition step of recognizing a flight position of a target aircraft; a map information acquisition step of acquiring map information including an area below the flight position of the target aircraft; a predetermined object extraction step of extracting a predetermined object present on the ground below the target aircraft based on the flight position of the target aircraft and the map information; a predetermined object information acquisition step of accessing an information database in which information regarding the predetermined object is recorded and acquiring predetermined object information regarding the predetermined object; and a display control step of displaying an information display screen in which the predetermined object information is superimposed on scenery below the target aircraft on a display unit viewed by a user who is on the target aircraft.

By executing the information provision method of configuration 9 by a computer, effects similar to that of the information provision system of configuration 1 can be obtained.

REFERENCE SIGNS LIST

1 . . . information provision system, 10 . . . processor, 11 . . . flight position recognition unit, 12 . . . map information acquisition unit, 13 . . . user action schedule recognition unit, 14 . . . user preference recognition unit, 15 . . . speech content recognition unit, 16 . . . visual line direction recognition unit, 17 . . . predetermined object extraction unit, 18 . . . predetermined object information acquisition unit, 19 . . . display control unit, 20 . . . facility reservation arrangement unit, 30 . . . memory, 31 . . . program, 32 . . . map information DB, 40 . . . communication unit, 41 . . . . GNSS sensor, 42 . . . outside camera, 43 . . . window glass display, 44 . . . seat display, 45 . . . seat camera, 46 . . . seat microphone, 47 . . . seat, 48 . . . window glass, 50 . . . communication terminal, 100 . . . aircraft, 200 . . . user management system, 201 . . . user information DB, 210 . . . schedule management system, 211 . . . schedule information DB, 220 . . . aircraft management system, 230 . . . area information server, 231 . . . area information DB, 300 . . . communication network, 500 . . . information display screen, 510 . . . flight route guide, U . . . user.

What is claimed is:
1. An information provision system comprising:
a processor configured to serve as:
    a flight position recognition unit configured to recognize a flight position of a target aircraft;
    a map information acquisition unit configured to acquire map information including an area below the flight position of the target aircraft;
    a predetermined object extraction unit configured to extract a predetermined object present on the ground below the target aircraft based on the flight position of the target aircraft and the map information;
    a predetermined object information acquisition unit configured to access an information database in which information regarding the predetermined object is recorded and to acquire predetermined object information regarding the predetermined object; and
    a display control unit configured to display an information display screen in which the predetermined object information is superimposed on scenery below the target aircraft on a display viewed by a passenger who is on the target aircraft, wherein
    the scenery is actual scenery that is below the target aircraft and is used as a background on the display viewed by the passenger.

2. The information provision system according to claim 1, wherein the display control unit controls a display position of the predetermined object information on the information display screen such that a position of the predetermined object in the scenery below the target aircraft and the display position of the predetermined object information are viewed in an overlapping manner by the passenger.

3. The information provision system according to claim 1, wherein the display control unit displays an air route of the target aircraft and the flight position of the target aircraft on the air route on the information display screen.

4. The information provision system according to claim 1, comprising a passenger action schedule recognition unit configured to access a schedule information database in which schedule information of the passenger is recorded and to recognize an action schedule associated with travel of the passenger on the target aircraft, wherein the predetermined object extraction unit extracts an object suited to the action schedule of the passenger as the predetermined object.

5. The information provision system according to claim 1, comprising a passenger preference recognition unit configured to access a passenger information database in which information regarding a preference of the passenger is recorded and to recognize the preference of the passenger, wherein the predetermined object extraction unit extracts an object suited to the preference of the passenger as the predetermined object.

6. The information provision system according to claim 1, comprising a speech content recognition unit configured to recognize speech contents of the passenger, wherein the predetermined object extraction unit extracts an object suited to the speech contents of the passenger as the predetermined object.

7. The information provision system according to claim 1, wherein the processor is further configured to serve as a visual line direction recognition unit configured to recognize a direction of a visual line of the passenger, wherein the predetermined object extraction unit recognizes an object present in a direction in which the visual line of the passenger is directed as the predetermined object.

8. The information provision system according to claim 1, wherein the predetermined object is a facility that is available for reservation to use, the information provision system comprising a facility reservation arrangement unit configured to receive a reservation operation for the facility by the passenger and to execute processing for arranging a reservation of the facility.

9. An information provision system comprising a processor configured to serve as:

a flight position recognition unit configured to recognize a flight position of a target aircraft;

a map information acquisition unit configured to acquire map information including an area below the flight position of the target aircraft;

a predetermined object extraction unit configured to extract a predetermined object present on the ground below the target aircraft based on the flight position of the target aircraft and the map information;

a predetermined object information acquisition unit configured to access an information database in which information regarding the predetermined object is recorded and to acquire predetermined object information regarding the predetermined object; and a display control unit configured to display an information display screen in which the predetermined object information is superimposed on actual scenery below the target aircraft on a display viewed by a user who is on the target aircraft, wherein the display is a transmission type display, the display control unit displays the information display screen so that the predetermined object information is visually superimposed on the actual scenery in a state in which the user who is on the target aircraft can directly view the actual scenery below the target aircraft through the transmission type display.

10. The information provision system according to claim 9, wherein the display control unit controls a display position of the predetermined object information on the information display screen such that a position of the predetermined object in the scenery below the target aircraft and the display position of the predetermined object information are viewed in an overlapping manner by the user.

11. The information provision system according to claim 9, wherein the display control unit displays an air route of the target aircraft and the flight position of the target aircraft on the air route on the information display screen.

12. The information provision system according to claim 9, comprising a user action schedule recognition unit configured to access a schedule information database in which schedule information of the user is recorded and to recognize an action schedule associated with travel of the user on the target aircraft, wherein the predetermined object extraction unit extracts an object suited to the action schedule of the user as the predetermined object.

13. The information provision system according to claim 9, comprising a user preference recognition unit configured to access a user information database in which information regarding a preference of the user is recorded and to recognize the preference of the user, wherein the predetermined object extraction unit extracts an object suited to the preference of the user as the predetermined object.

14. The information provision system according to claim 9, comprising a speech content recognition unit configured to recognize speech contents of the user, wherein the predetermined object extraction unit extracts an object suited to the speech contents of the user as the predetermined object.

15. The information provision system according to claim 9, wherein the processor is further configured to serve as a visual line direction recognition unit configured to recognize a direction of a visual line of the user, wherein the predetermined object extraction unit recognizes an object present in a direction in which the visual line of the user is directed as the predetermined object.

16. The information provision system according to claim 9, wherein the predetermined object is a facility that is available for reservation to use, the information provision system comprising a facility reservation arrangement unit configured to receive a reservation operation for the facility by the user and to execute processing for arranging a reservation of the facility.

17. An information provision system comprising a processor configured to serve as:

a flight position recognition unit configured to recognize a flight position of a target aircraft;

a map information acquisition unit configured to acquire map information including an area below the flight position of the target aircraft;

a predetermined object extraction unit configured to extract a predetermined object present on the ground below the target aircraft based on the flight position of the target aircraft and the map information;

a predetermined object information acquisition unit configured to access an information database in which information regarding the predetermined object is recorded and to acquire predetermined object information regarding the predetermined object;

a display control unit configured to display an information display screen in which the predetermined object information is superimposed on scenery below the target aircraft on a display viewed by a user who is on the target aircraft; and a visual line direction recognition unit, the visual line direction recognition unit being configured to recognize a direction of a visual line of the user, wherein the predetermined object extraction unit recognizes an object present in a direction in which the visual line of the user is directed as the predetermined object.

* * * * *